(12) United States Patent
Mizuno et al.

(10) Patent No.: US 7,841,443 B2
(45) Date of Patent: Nov. 30, 2010

(54) STEERING APPARATUS (75) Inventors: Takahiro Mizuno, Nara (JP); Shiro Nakano, Osaka (JP); Kunihiro Oka, Nara (JP)

(73) Assignee: Jtekt Corporation, Osaka-Shi (JP)

( * ) Notice: Subject to any disclaimer, the term of this patent is extended or adjusted under 35 U.S.C. 154(b) by 519 days.

(21) Appl. No.: 11/837,660

(22) Filed: Aug. 13, 2007

(65) Prior Publication Data
US 2008/0042389 A1 Feb. 21, 2008

(30) Foreign Application Priority Data
Aug. 21, 2006 (JP) ............... 2006-224489
Sep. 4, 2006 (JP) ............... 2006-239380

(51) Int. Cl.
*B62D 5/04* (2006.01)
(52) U.S. Cl. .............. 180/444; 180/443; 180/445; 180/446; 280/93.514
(58) Field of Classification Search ......... 180/444–446; 280/93.514
See application file for complete search history.

(56) References Cited

U.S. PATENT DOCUMENTS

| | | | |
|---|---|---|---|
| 4,766,970 A | 8/1988 | Shimizu | |
| 5,280,729 A * | 1/1994 | Aoki et al. | 73/862.333 |
| 5,746,285 A * | 5/1998 | Yonezawa | 180/428 |
| 6,301,975 B1 * | 10/2001 | Chikaraishi | 73/862.331 |
| 6,422,095 B1 * | 7/2002 | Shimizu et al. | 73/862.335 |
| 7,284,635 B2 * | 10/2007 | Chikaraishi | 180/444 |
| 7,325,646 B2 * | 2/2008 | Asada | 180/444 |
| 7,540,204 B2 * | 6/2009 | Harata et al. | 73/862.331 |
| 7,624,653 B2 * | 12/2009 | Watanabe et al. | 73/862.331 |
| 2003/0178244 A1 * | 9/2003 | Namgung | 180/443 |
| 2005/0016789 A1 * | 1/2005 | Asada | 180/444 |
| 2005/0060994 A1 * | 3/2005 | Ooguchi et al. | 60/384 |
| 2005/0236222 A1 * | 10/2005 | Chikaraishi | 180/444 |
| 2006/0042404 A1 * | 3/2006 | Shimizu et al. | 73/862.331 |
| 2006/0102416 A1 * | 5/2006 | Kojima et al. | 180/414 |
| 2008/0047775 A1 * | 2/2008 | Yamazaki | 180/443 |
| 2009/0255349 A1 * | 10/2009 | Segawa | 73/862.325 |

FOREIGN PATENT DOCUMENTS

| | | |
|---|---|---|
| EP | 0410583 A1 | 1/1991 |
| JP | 8-29709 B2 | 3/1996 |
| JP | 10-104093 A | 4/1998 |
| JP | 11-321685 A | 11/1999 |

* cited by examiner

*Primary Examiner*—Lesley Morris
*Assistant Examiner*—Tashiana Adams
(74) *Attorney, Agent, or Firm*—Oliff & Berridge, PLC (57) ABSTRACT There is provided a steering apparatus including a pinion communicating with an operation of a steering member, a rack shaft having a rack meshed with the pinion, and a support yoke resiliently coming into contact with the rack shaft, and being configured to convert rotation of the pinion into movement of the rack shaft in an axial direction in a meshing portion in which the pinion and rack mesh to each other. The steering apparatus comprises a detection unit for detecting a force applied to the support yoke to which a force acting on the meshing portion being transmitted from the rack shaft and a calculation unit for calculating a steering torque applied to the steering member based on the force detected by the detection unit, wherein the pinion and the rack are formed in helical gears.

10 Claims, 9 Drawing Sheets

STEERING APPARATUS

CROSS-REFERENCE OF RELATED APPLICATIONS

This nonprovisional application claims priority under 35 U.S.C. §119(a) on Patent Application No. 2006-224489 in Japan on Aug. 21, 2006 and Patent Application No. 2006-239380 in Japan on Sep. 4, 2006, the entire contents of which are hereby incorporated by reference.

BACKGROUND

1. Technical Field

The present invention relates to a steering apparatus including a rack-and-pinion-type steering mechanism, and a detection means for detecting a steering torque applied to a steering member.

2. Description of Related Art

A steering apparatus to steer a vehicle is configured to drive a steering mechanism by transmitting a driver's operation of a steering member such as a steering wheel to the steering mechanism. For such a steering mechanism, a rack-and-pinion-type steering mechanism has been widely adopted. This type of steering mechanism is configured to convert a rotation of a pinion, in accordance with the rotational operation of the steering member, into an axial movement of a rack shaft having a rack meshed with the pinion, and perform a push-and-pull operation of right and left front wheels coupled to both ends of the rack shaft. The rack-and-pinion-type steering mechanism includes a support yoke resiliently contacting the rack shaft from both sides of a meshed portion between the rack and the pinion so that they favorably mesh with each other, without backlash, while applying preload to the meshed portion. Further, for many of the rack-and-pinion-type steering mechanisms, the pinion and the rack are formed with helical gears, each of which typically has a large contact ratio for mass load transmittance.

In recent years, in order to reduce the burden of the driver who operates the steering member, a steering apparatus configured as an electric power steering apparatus that detects a steering torque applied to the steering member by a torque sensor, drives a steering assist motor based on the detected steering torque, and applies an assisting force to the steering mechanism, is widespread.

The torque sensor is arranged at an intermediate position of the steering column which transmits the operation of the steering member to the steering mechanism, and is configured to detect a torsion generated on the steering column due to an action of the steering torque. Typically, to improve the detection accuracy of the steering torque by amplifying the torsion for the torque sensor, a coupling portion for coupling an input shaft on the side of the steering member and an output shaft on the side of the steering mechanism at an intermediate position of the steering column by a torsion bar of low rigidity is provided, and the torsion of the torsion bar in the coupling portion is detected by an appropriate means.

SUMMARY

For the steering apparatus including such a torque sensor, because the torsion bar may act as a damper, problems may arise such as difficulty in transmission of a road condition to the steering member, and the steering mechanism reacts with a slight time delay when the steering member is operated. Therefore, a steering feel may be degraded.

To address these problems, for the steering apparatus including the rack-and-pinion-type steering mechanism, it has been proposed to detect a force acting on the rack shaft in the axial direction (hereinafter, referred to as "a rack shaft force"), and calculate the steering torque applied to the steering member based on the rack shaft force (for example, refer to Japanese Patent Application Laid-Open No. H11-321685).

The Japanese Patent Application Laid-Open No. H11-321685 discloses a configuration in which force sensors for detecting the rack shaft force are disposed at intermediate positions of the rack shaft that projects from a rack housing for supporting the rack shaft, and the rack shaft force is directly detected by the force sensors. Further, the Japanese Patent Application Laid-Open No. H11-321685 discloses a configuration in which load sensors for detecting loads on knuckle arms of front wheels, and the rack shaft force is detected based on the detected loads. However, because the force sensors or load sensors are exposed to outside environment, these configurations may cause problems such as a reduction in the detection accuracy or a failure of the sensors due to an influence of foreign substances such as water, mud, dust, etc.

An object is to provide a steering apparatus capable of improving a steering feel by detecting a steering torque applied to a steering member without using a torsion bar of low rigidity, and capable of preventing problems such as a reduction in detection accuracy, or a failure of a detection means.

There is provided a steering apparatus according to an aspect including a pinion that rotates in accordance with an operation of a steering member, a rack shaft having a rack meshed with the pinion, and a support yoke resiliently coming into contact with the rack shaft from an opposite side of a meshed portion of the rack and the pinion so as to be provided with the rack shaft between the opposite side and the meshed portion, and being configured to convert rotation of the pinion into movement of the rack shaft in an axial direction in the meshed portion, the steering apparatus comprising:

a detection unit for detecting a force applied to the support yoke to which a force acting on the meshed portion being transmitted from the rack shaft; and a calculation unit for calculating a steering torque applied to the steering member based on the force detected by the detection unit, wherein the pinion and the rack are formed in helical gears.

There is provided a steering apparatus according to an aspect for steering a vehicle by converting rotation of a pinion in accordance with an operation of a steering member into movement of a rack shaft in an axial direction thereof, the rack shaft having a rack meshed with the pinion, the steering apparatus comprising:

a detection unit for detecting a force applied to the pinion in an axial direction thereof by reaction of an acting force on a meshed portion of the pinion and the rack; and a calculation unit for calculating a steering torque applied to the steering member based on the force detected by the detection unit, wherein the pinion and the rack are formed in helical gears.

DETAILED DESCRIPTION

Embodiment 1

Figure 1:
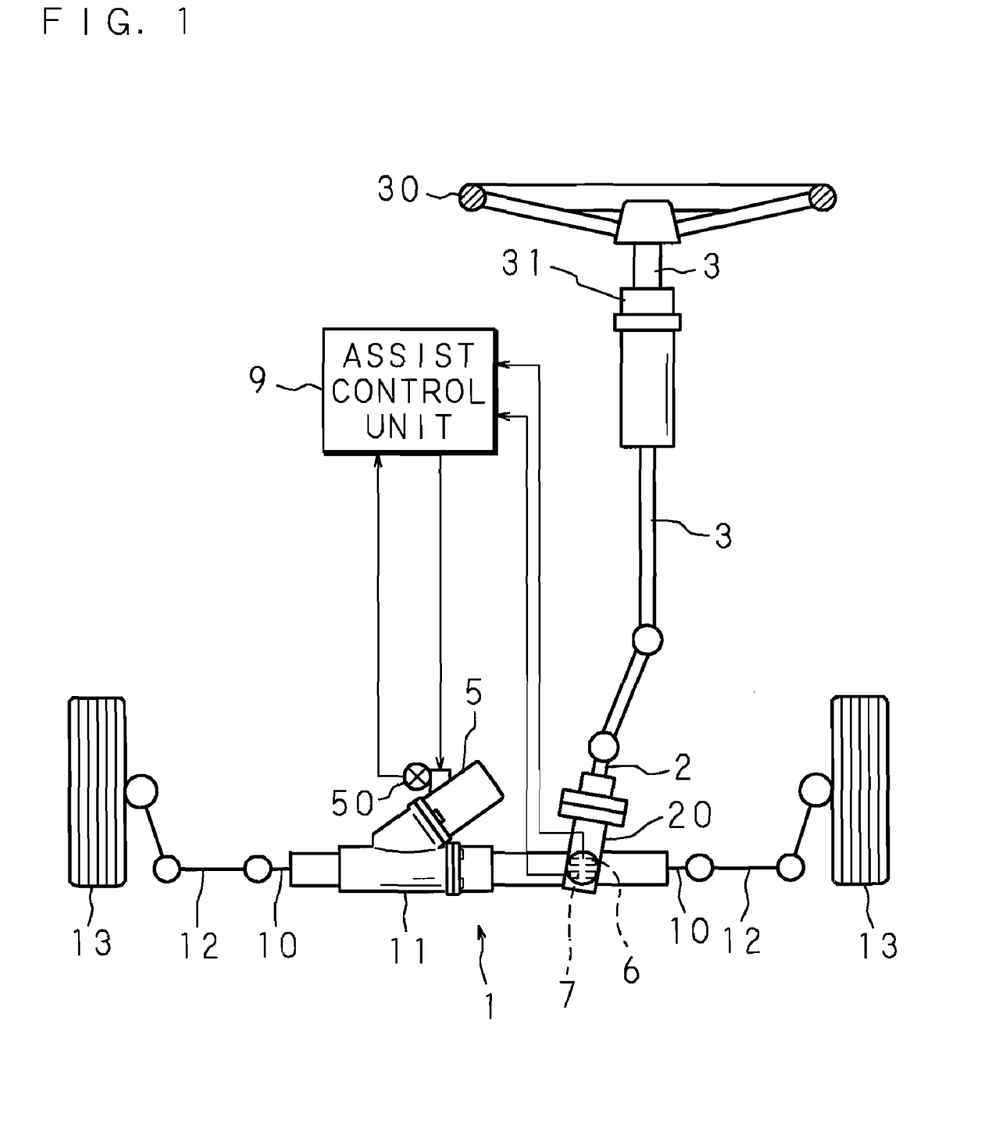
FIG. 1 is a schematic view showing a configuration of the steering apparatus according to one embodiment.

Hereinafter, Embodiments will be explained in detail based on the appended drawings. FIG. 1 is a schematic view showing a configuration of a steering apparatus according to the embodiments. The steering apparatus shown in FIG. 1 includes a rack-and-pinion-type steering mechanism, and is configured to be a rack-assist-type electric power steering apparatus.

The rack-and-pinion-type steering mechanism 1 has a known configuration in which it includes a rack shaft 10 movably supported in the axial direction inside a rack housing 11 extending to the left-and-right direction of the vehicle body (not illustrated), and a pinion shaft 2 rotatably supported inside the pinion housing 20 which intersects with the rack housing 11 at an intermediate position of the rack housing 11.

Both ends of the rack shaft 10 which projects outside from the both sides of the rack housing 11 are coupled to front wheels 13 on the left and right sides as steerable wheels through respective tie rods 12. Further, an upper end of the pinion shaft 2 which projects outside from one side of the pinion housing 20 is coupled to a steering wheel 30 as a steering member through a steering column 3.

The steering column 3 is rotatably supported inside a column housing 31 of a cylindrical shape, and is mounted inside a vehicle cabin (not illustrated) through the column housing 31 so that it inclines with its front end down. An end of the steering column 3 projecting downwardly from the column housing 31 is coupled to the pinion shaft 2. A steering wheel 30 is fixed to the other end of the steering column 3 projecting upwardly.

Figure 2:
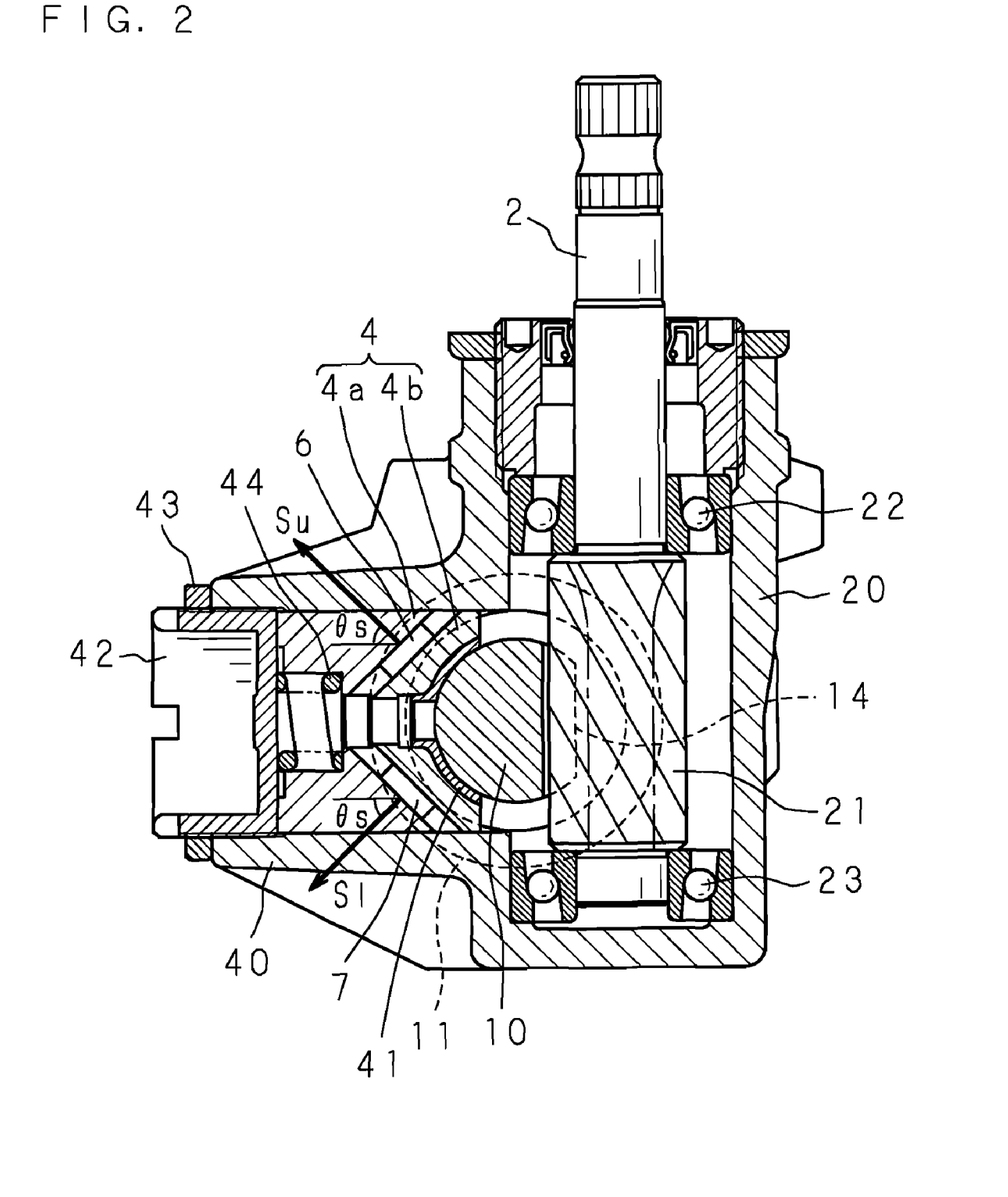
FIG. 2 is a longitudinal cross-sectional view schematically showing a portion in proximity to an intersecting portion of a pinion housing and a rack housing.

FIG. 2 is a longitudinal cross-sectional view schematically showing a portion in proximity to the intersecting portion of the pinion housing 20 and the rack housing 11. As illustrated, the pinion shaft 2 includes a pinion 21 integrally formed therewith. A lower half portion of the pinion 21 is larger in its diameter than the rest of the pinion 21. The pinion shaft 2 is rotatably supported inside the pinion housing 20 through a pair of bearings 22 and 23 located above and below the pinion 21, respectively.

As described above, the rack housing 11 of cylindrical shape is integrally formed with a lower half portion of the pinion housing 20 on one side so that their axial centers intersect with each other. The rack shaft 10 supported inside the rack housing 11 includes a rack 14 integrally formed with the rack shaft 10 on the side facing a portion communicating with the pinion housing 20 so that the rack 14 extends for a predetermined length in the axial direction of the rack shaft 10. The rack 14 meshes with the pinion 21.

At the intersecting portion of the rack housing 11 and the pinion housing 20, a yoke housing 40 of cylindrical shape projects toward a direction perpendicular to both the rack housing 11 and the pinion housing 20. A support yoke 4 having a circular cross-section is fitted inside the yoke housing 40 so that it is held slidable in the axial direction.

One end of the support yoke 4 facing inside the rack housing 11 has an arch shape corresponding to an outer contour of the rack shaft 10, and slidably contacts to an outer peripheral surface of the rack shaft 10 from the other side of the meshed portion between the pinion 21 and the rack 14 through a slide plate 41. Further, the other end of the support yoke 4 contacts a bottom surface of a support cap 42 which is fixedly fitted into an opening of the yoke housing 40 so as to be positioned by a lock nut 43. A push spring 44 is inserted between the opposing faces of the support yoke 4 and the support cap 42. The support yoke 4 is biased by a spring force of the push spring 44 toward the rack shaft 10 so that it resiliently contacts the rack shaft 10.

The support yoke 4 attached in this way pushes the rack shaft 10 against the pinion shaft 2, and gives preload to the meshed portion of the rack 14 and the pinion 21 so that they excellently mesh with each other without a backlash. The preload may be appropriately adjusted by changing in the fitting depth of the support cap 42.

With the above configuration, when the steering wheel 30 is rotated for steering, this rotation is transmitted to the pinion shaft 2 through the steering column 3, and the rotation of the pinion shaft 2 is converted into a movement of the rack shaft 10 in the axial direction at the meshed portion of the pinion 21 and the rack 14. Such a movement of the rack shaft 10 causes pushing and pulling of the front wheels 13 on the left and right sides through the respective tie rods 12 and, thus, steering of the vehicle is carried out.

A steering assist motor 5 is attached to an intermediate position of an outside perimeter of the rack housing 11. An output shaft of the motor 5 extends inside of the rack housing 11, and is configured to transmit a force through a movement conversion mechanism such as a ball screw mechanism, to an intermediate portion of the rack shaft 10. The motor 5 operates based on a steering torque calculated as described later. By transmitting the rotation generated by the motor operation to the rack shaft 10 through the movement conversion mechanism, the steering of the vehicle is assisted.

As shown in FIG. 2, the support yoke 4 includes a biased portion 4a that is located on the side of the support cap and biased by the push spring 44, and a resilient portion 4b that is located on the side of the rack shaft 10 and resiliently contact an outer peripheral surface of the rack shaft 10. In the cross-section shown in FIG. 2, an opposing end face of the biased portion 4a to the resilient portion 4b is formed in a V-shape. The end face inclines at an angle (90 degree minus θs degree) with respect to an axial center of the support yoke 4 which passes through the center of the circular cross-section and is in parallel with the sliding direction. Similarly, in the cross-section shown in FIG. 2, an opposing end face of the resilient portion 4b to the biased portion 4a is formed in an inverted V-shape. The end face inclines at an angle (90 degree minus θs degree) with respect to an axial center of the support yoke 4. Load cells 6 and 7 are sandwiched between the end faces of the biased portion 4a and the resilient portion 4b. Each of the load cells 6 and 7 is a known force sensor such as a strain gauge attached to an elastic body, which detects a distortion of the elastic body due to an applied force as a change in an electrical resistance of the strain gauge, and calculates the applied force based on the change, for example.

The steering apparatus according to the embodiment detects a force acting on the support yoke 4 by using the load cells 6 and 7 provided as described above, and calculates a torque applied to the pinion shaft 2 (i.e., the steering torque) based on the detected force. Hereinbelow, first, a relationship between the force acting on the support yoke 4 and the torque applied to the pinion shaft 2 will be explained with reference to FIG. 3, which is a diagram illustrating forces acting on the steering mechanism 1.

Figure 3:
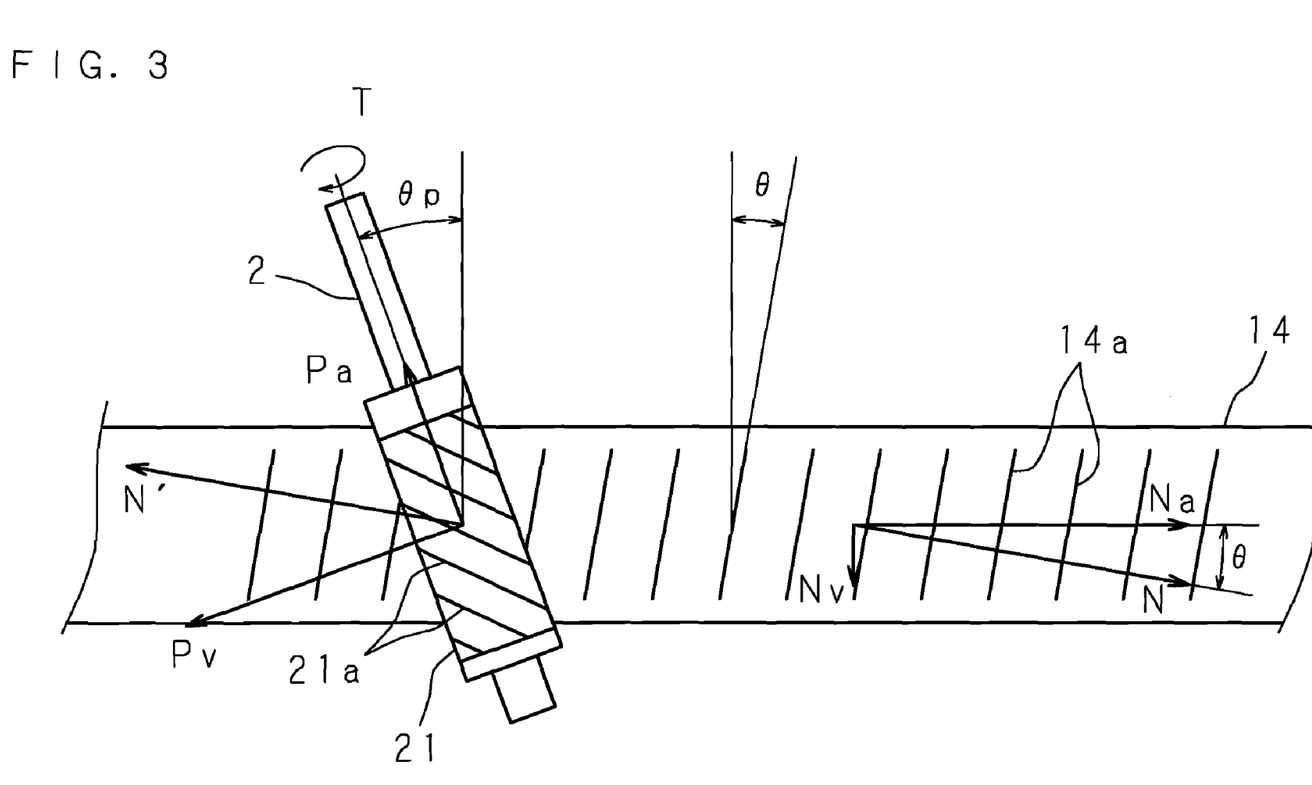
FIG. 3 is an explanatory diagram illustrating forces acting on the steering mechanism.

As shown in FIG. 3, the rack 14 includes two or more rack teeth 14a formed as a helical gear. These rack teeth 14a mesh with the pinion gear teeth 21a formed on an outer peripheral surface of the pinion 21 as a helical gear. When a torque T is applied to the pinion shaft 2, a force N which is perpendicular to tooth flanks of the pinion gear tooth 21a and the rack gear tooth 14a acts on the rack 14 at the meshed portion of the pinion 21 and the rack 14. A reaction force N' of the applied force N acts on the pinion 21 with a relationship between action and reaction. Here, the reaction force N' acting on the pinion 21 and the force N acting on the rack 14 always equal to each other with the relationship between action and reaction. Because the pinion gear teeth 21a of the pinion 21 and the rack gear teeth 14a of the rack 14 are formed in helical gears, the reaction force N' acting on the pinion 21 is expressed by a component force Pv in the radial direction, and a component force Pa in the axial direction, and the force N acting on the rack 14 is expressed by a component force Na in the axial direction, and a component force Nv in a direction perpendicular to both of the axial centers of the support yoke 4 and the rack shaft 10 (the vertical direction in FIG. 3).

The relationship between the torque T applied to the pinion shaft 2 and the component force Na in the axial direction of the force N acting on the rack 14 due to the torque T can be expressed by the following equation.

$$T = Na \cdot S/(2\pi) \quad (1)$$

Here, S is a rack stroke ratio representing a moving distance of the rack shaft 10 while the pinion shaft 2 rotates once. The torque T applied to the pinion shaft 2 is designated with its sign (positive/negative) according to a rotating direction of the steering wheel 30 from its neutral position. Thus, the sign is positive for rotating to the right from the neutral position, and, negative for rotating to the left from the neutral position, for example.

As shown in FIG. 3, where the inclined angle of the rack gear tooth 14a formed as a helical gear is θ degree, a relationship between the component force Na in the axial direction and the component force Nv in the vertical direction of the force N acting on the rack 14 is expressed by the following equation.

$$Na = Nv/\tan\theta \quad (2)$$

Substituting Equation (2) to Equation (1), the following equation can be obtained.

$$T = Nv \cdot S/(2\pi \cdot \tan\theta) \quad (3)$$

As described above, by detecting the component force Nv in the vertical direction of the force N acting on the rack 14, the torque T applied to the pinion shaft 2 can be calculated applying the detected value of Nv to Equation (3). The component force Nv in the vertical direction is transmitted to the support yoke 4 resiliently contacting the rack shaft 10. The load cells 6 and 7 are provided to the support yoke 4 as described above, for the purpose of detecting Nv. Here, in this embodiment, the component force Na in the axial direction of the force N acting on the rack 14 is designated as positive for the right direction, and negative for the left direction. Further, the component force Nv in the vertical direction is designated as positive for the downward direction, and negative for the upward direction.

As shown in FIG. 2, the forces detected by the load cells 6 and 7 are Su and Sl, respectively. Further, the angle of the force acting on the load cells 6 and 7 from the rack shaft 10 through the resilient portion 4b is θs degree with respect to the axial center of the support yoke 4. Therefore, the component force Nv in the vertical direction of the force N acting on the rack 14 described above can be calculated from the following equation.

$$Nv = (Sl - Su) \cdot \sin\theta s \quad (4)$$

Here, θs is set to an arbitrary angle up to 90 degrees other than 0 degree. In the steering apparatus configured as above, when the steering wheel 30 is operated to the right or the left, a downward or upward force acts on the rack 14, respectively. Thus, the difference between the forces detected by the load cells 6 and 7 (=Sl−Su) becomes as positive or negative, respectively.

The detection results by the load cells 6 and 7 are given to the assist control module 9, as shown in FIG. 1. Using the forces Su and Sl detected by the load cells 6 and 7, respectively, the assist control module 9, specifically, as shown in Equation (4), calculates a force applied to the support yoke 4 according to the difference between the component forces in the vertical direction of the detected forces Su and Sl, that is, the component force Nv in the vertical direction of the force N acting on the rack 14. The assist control module 9 then calculates the torque T applied to the pinion shaft 2 by applying the calculated Nv to Equation (3). The torque T applied to the pinion shaft 2 which is calculated by the calculation equals to steering torque Th applied to the steering wheel 30.

The assist control module 9 transmits a control instruction to the steering assist motor 5 based on the steering torque Th calculated as above to perform the assist control operation in which the assist control module 9 increases and decreases a drive current of the motor 5. Further, a detection result by a motor current sensor 50 for detecting the current of the steering assist motor 5 is also transmitted to the assist control module 9. The current detected by the motor current sensor 50 is used as a feedback signal for controlling the steering assist motor 5.

The steering apparatus according to the embodiment configured as above calculates the force applied to the support yoke 4 according to the force acting on the meshed portion of the pinion 21 and the rack 14 in accordance with the rotation of the steering wheel 30, that is, the component force Nv in the vertical direction of the force N acting on the rack 14 based on the difference between the forces Su and Sl detected by the load cells 6 and 7, respectively, as shown in Equation (4). Then, the steering apparatus can calculate the torque T applied to the pinion shaft 2, that is, the steering torque Th applied to the steering wheel 30 by applying the calculated Nv to Equation (3). As a result, it is not necessary to provide a torsion bar of low rigidity such as a conventional torque sensor, and a steering feel can be improved by constituting the steering column 3 with a hollow or solid member of high rigidity. Further, as shown in FIG. 2, because the load cells 6 and 7 is provided inside the yoke housing 40 for supporting the support yoke 4, they are not exposed to the outside environment. Therefore, it is possible to prevent problems, such as a reduction in detection accuracy and a failure under the influence of foreign substances such as water, mud, dust, etc.

Further, in the steering apparatus, two load cells 6 and 7 are disposed at positions symmetrical with a plane including the axial centers of the support yoke 4 and rack shaft 10. The steering apparatus calculates the component force Nv in the vertical direction of the force acting on the rack 14 using Equation (4) based on the difference between the forces detected by the load cells 6 and 7. Then the steering apparatus calculates the torque T applied to the pinion shaft 2, that is, the steering torque Th applied to the steering wheel 30 using Equation (3) based on the calculated component force Nv. Therefore, it is possible to calculate the steering torque. Further, because the steering apparatus calculates the difference between the detection results of the load cells 6 and 7 using one of them as a reference with respect to the other, it is possible to calculate the direction of the steering torque Th applied to the steering wheel 30 based on the sign (positive/negative) of the calculated difference.

Here, modifications are possible for other steering apparatuses without being limited to the rack-assist-type electric power steering apparatus as illustrated in the disclosure of this Embodiment 1. The modifications may also include a column-assist-type electric power steering apparatus in which a steering assist motor is attached to the outer peripheral surface of the column housing 31, and the motor transmits a power to the steering column 3.

Embodiment 2

In the column-assist-type electric power steering apparatus, the assisting torque by the steering assist motor is included in the torque T applied to the pinion shaft 2. Therefore, in order to calculate the steering torque Th applied to the steering wheel 30, it is necessary to subtract the assisting torque from the torque T applied to the pinion shaft 2. The steering torque Th can be expressed as the following equation using the torque T applied to the pinion shaft 2 which can be calculated by Equation (3).

$$Th = T - Tm \cdot \alpha \qquad (5)$$

Here, Tm is a motor torque, and can be expressed by the product of a motor current Is and a torque constant Kt of the motor. $\alpha$ is a transmission ratio of a transmission means for reducing a rotation of an output shaft of the steering assist motor, and transmitting the reduced rotation to the steering column 3.

In the above Embodiments 1 and 2, it has been explained that the plane defined by the support yoke 4 and the rack shaft 10 is the plane including the axial centers of the support yoke 4 and the rack shaft 10. However, embodiments are not limited to this configuration. For example, the plane may also be a plane that includes the axial center of the support yoke 4, and inclines by a predetermined angle with respect to the axial center of the rack shaft 10.

Further, in the above Embodiments 1 and 2, it has been explained that the load cells 6 and 7 are used as the detection means for detecting the force applied to the support yoke 4 from the rack shaft 10. However, embodiments are not limited to this configuration, and the detection means may be configured to merely detect the force applied to the support yoke 4. Further, in this embodiment, it has been explained that the load cells 6 and 7 are provided inside the yoke housing 40 for supporting the support yoke 4. However, embodiments are not limited to this configuration, and it may be configured so that a recessed portion is provided in an inner surface of the yoke housing 40, and a load cell is provided in the recessed portion so as to contact an outer surface of the support yoke 4.

Further, without being limited to the embodiments described above, modifications may be implemented in various forms modified within the scope as may be described in the claims.

Embodiment 3

Figure 4:
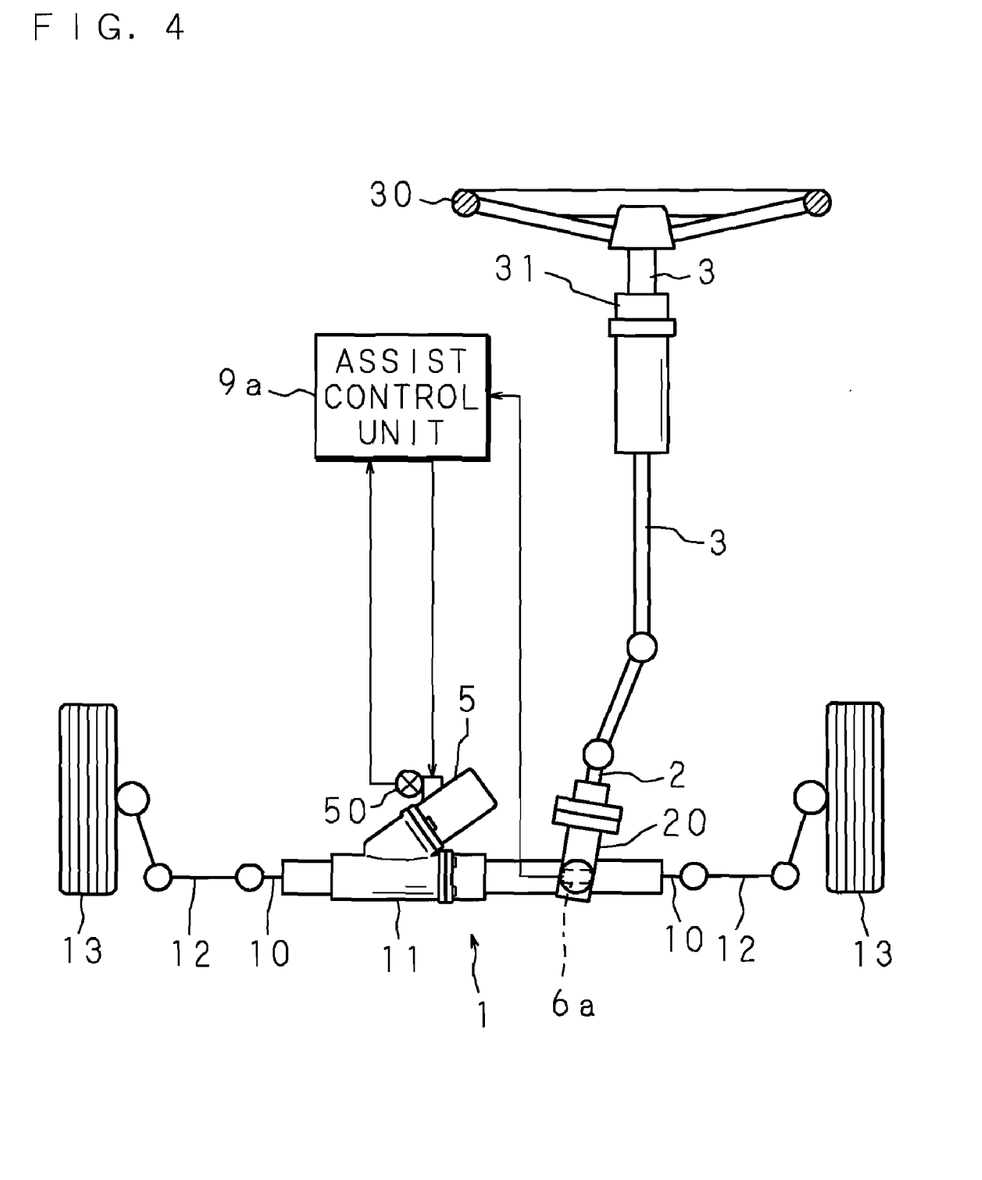
FIG. 4 is a schematic view showing the configuration of the steering apparatus according to one embodiment.

FIG. 4 is a schematic view showing a configuration of a steering apparatus according to embodiments. The steering apparatus shown in FIG. 4 includes a rack-and-pinion-type steering mechanism, and is configured to be a rack-assist-type electric power steering apparatus.

The rack-and-pinion-type steering mechanism 1 has a known configuration in which it includes a rack shaft 10 movably supported in the axial direction inside a rack housing 11 extending to the left-and-right direction of the vehicle body (not illustrated), and a pinion shaft 2 rotatably supported inside the pinion housing 20 which intersects with the rack housing 11 at an intermediate position of the rack housing 11.

Both ends of the rack shaft 10 which projects outside from the both sides of the rack housing 11 are coupled to front wheels 13 on the left and right sides as steerable wheels through respective tie rods 12. Further, an upper end of the pinion shaft 2 which projects outside from one side of the pinion housing 20 is coupled to a steering wheel 30 as a steering member through a steering column 3.

The steering column 3 is rotatably supported inside a column housing 31 of a cylindrical shape, and is mounted inside a vehicle cabin (not illustrated) through the column housing 31 so that it inclines with its front end down. An end of the steering column 3 projecting downwardly from the column housing 31 is coupled to the pinion shaft 2. A steering wheel 30 is fixed to the other end of the steering column 3 projecting upwardly.

Figure 5:
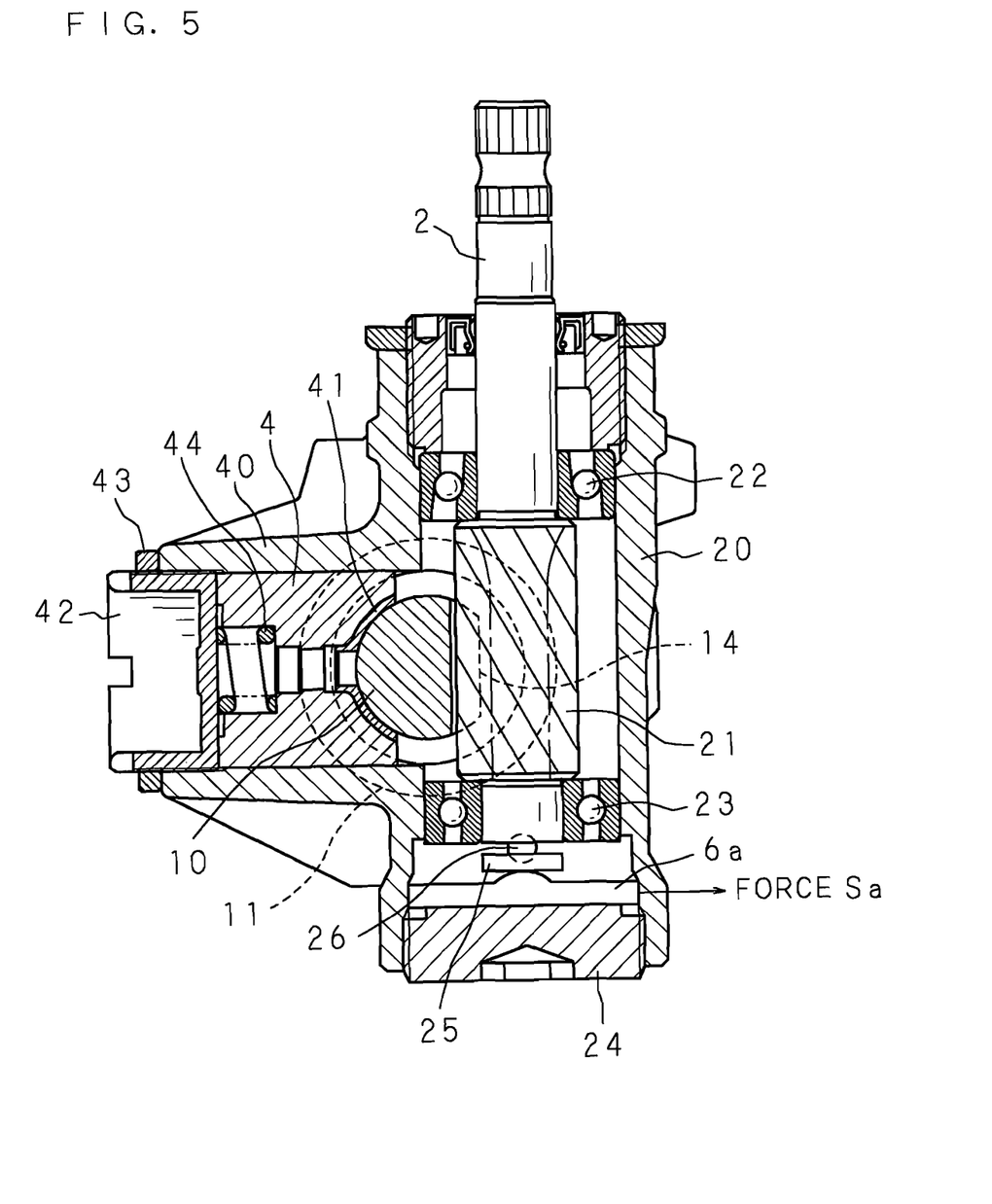
FIG. 5 is a longitudinal cross-sectional view schematically showing a portion in proximity to the intersecting portion of the pinion housing and the rack housing.

FIG. 5 is a longitudinal cross-sectional view schematically showing a portion in proximity to the intersecting portion of the pinion housing 20 and the rack housing 11. As illustrated, the pinion shaft 2 includes a pinion 21 integrally formed therewith. A lower half portion of the pinion 21 is larger in its diameter than the rest of the pinion 21. The pinion shaft 2 is rotatably supported inside the pinion housing 20 through a pair of bearings 22 and 23 located above and below the pinion 21, respectively.

A bearing 22 above the pinion 21 is an angular contact ball bearing, and a bearing 23 below the pinion 21 is a deep groove ball bearing.

As described above, the rack housing 11 of cylindrical shape is integrally formed with a lower half portion of the pinion housing 20 on one side so that their axial centers intersect with each other. The rack shaft 10 supported inside the rack housing 11 includes a rack 14 integrally formed with the rack shaft 10 on the side facing a portion communicating with the pinion housing 20 so that the rack 14 extends for a predetermined length in the axial direction of the rack shaft 10. The rack 14 meshes with the pinion 21.

At the intersecting portion of the rack housing 11 and the pinion housing 20, a yoke housing 40 of cylindrical shape projects toward a direction perpendicular to both the rack housing 11 and the pinion housing 20. A support yoke 4 having a circular cross-section is fitted inside the yoke housing 40 so that it is held slidable in the axial direction.

One end of the support yoke 4 facing inside the rack housing 11 has an arch shape corresponding to an outer contour of the rack shaft 10, and slidably contacts to an outer peripheral surface of the rack shaft 10 from the other side of the meshed portion between the pinion 21 and the rack 14 through a slide plate 41. Further, the other end of the support yoke 4 contacts a bottom surface of a support cap 42 which is fixedly fitted into an opening of the yoke housing 40 so as to be positioned by a lock nut 43. A push spring 44 is inserted between the opposing faces of the support yoke 4 and the support cap 42. The support yoke 4 is biased by a spring force of the push spring 44 toward the rack shaft 10 so that it resiliently contacts the rack shaft 10.

The support yoke 4 attached as described above functions to push the rack shaft 10 against the pinion shaft 2, and favorably mesh the rack 14 with the pinion 21 without backlash. The pushing force against the rack shaft 10 may be appropriately adjusted by changing the fitting depth of the support cap 42.

With the above configuration, when the steering wheel 30 is rotated for steering, this rotation is transmitted to the pinion shaft 2 through the steering column 3, and the rotation of the pinion shaft 2 is converted into a movement of the rack shaft 10 in the axial direction at the meshed portion of the pinion 21 and the rack 14. Such a movement of the rack shaft 10 causes pushing and pulling of the front wheels 13 on the left and right sides through the respective tie rods 12 and, thus, steering of the vehicle is carried out.

A steering assist motor 5 is attached to an intermediate position of an outside perimeter of the rack housing 11. An output shaft of the motor 5 extends inside of the rack housing 11, and is configured to transmit a force through a movement conversion mechanism such as a ball screw mechanism, to an intermediate portion of the rack shaft 10. The motor 5 operates based on a steering torque calculated as described later. By transmitting the rotation generated by the motor operation to the rack shaft 10 through the movement conversion mechanism, the steering of the vehicle is assisted.

As shown in FIG. 5, an opening portion is formed in a lower end of the pinion housing 20, and this opening portion is sealed by a threaded lower lid 24. A load cell 6a is disposed on an upper surface of the lower lid 24, and a plate-like load receiving seat 25 contacts a detecting portion on an upper surface of the load cell 6a. A recessed portion is formed in each of an upper surface of the load receiving seat 25 and a lower end face of the pinion shaft 2, and a ball 26 is rotatably sandwiched between the provided recessed portions.

The load cell 6a is a known force sensor such as a strain gauge attached to an elastic body, which detects a distortion of the elastic body by an applied force as a change in an electrical resistance of the strain gauge, and obtains the applied force based on the change, for example. This load cell 6a is preload as a force acting on a lower surface of the load cell 6a according to a fitting depth of the lower lid 24 into the pinion housing 20, and as a reaction force acting on the detecting portion of the load cell 6a from the lower end face of the pinion shaft 2 through the load receiving seat 25 and the ball 26. The preload is appropriately adjusted by changing the fitting depth of the lower lid 24 so that it is larger than the assumed maximum force acting on the pinion gear in the axial direction 2 during a steering operation. The ball 26 described above is provided to transmit only a force in the axial direction to the load cell 6a without transmitting a moment about the center axis generated by a rotation of the pinion 21. Further, the load receiving seat 25 is provided to cause the force in the axial direction received from the ball 26 to stably act on the load cell 6a.

With the above configuration, when a steering torque is applied to the steering wheel 30, and a force acts on the pinion 21 downwardly or upwardly in the axial direction by a reaction of the applied force from the pinion 21 to the rack 14 generated according to the steering torque, the force being detected by the load cell 6a increases or decreases.

The steering apparatus according to this embodiment detects the force acting on the pinion 21 using the load cell 6a provided as described above, and calculates the torque applied to the pinion shaft 2 (i.e., the steering torque) based on the detected force. Hereinbelow, first, a relationship between the force acting on the pinion 21 and the torque applied to the pinion shaft 2 will be explained with reference to FIG. 3 which is a diagram illustrating forces acting on the steering mechanism 1.

As shown in FIG. 3, the rack 14 includes two or more rack teeth 14a formed as a helical gear. These rack teeth 14a mesh with the pinion gear teeth 21a formed on an outer peripheral surface of the pinion 21 as a helical gear. When a torque T is applied to the pinion shaft 2, a force N which is perpendicular to tooth flanks of the pinion gear tooth 21a and the rack gear tooth 14a acts on the rack 14 at the meshed portion of the pinion 21 and the rack 14. A reaction force N' of the applied force N acts on the pinion 21 with a relationship between action and reaction. Here, the reaction force N' acting on the pinion 21 and the force N acting on the rack 14 always equal to each other with the relationship between action and reaction. Because the pinion gear teeth 21a of the pinion 21 and the rack gear teeth 14a of the rack 14 are formed in helical gears, the reaction force N' acting on the pinion 21 is expressed by a component force Pv in the radial direction, and a component force Pa in the axial direction, and the force N acting on the rack 14 is expressed by a component force Na in the axial direction, and a component force Nv in a direction perpendicular to both of the axial direction and the axial center of the support yoke 4 (the vertical direction in FIG. 3).

The relationship between the torque T applied to the pinion shaft 2 and the component force Na in the axial direction of the force N acting on the rack 14 due to the torque T can be expressed by the following equation.

$$T = Na \cdot S/(2\pi) \quad (6)$$

Here, S is a rack stroke ratio representing a moving distance of the rack shaft 10 while the pinion shaft 2 rotates once. The torque T applied to the pinion shaft 2 is designated with its sign (positive/negative) according to a rotating direction of the steering wheel 30 from its neutral position. Thus, the sign is positive for rotating to the right from the neutral position, and, negative for rotating to the left from the neutral position, for example.

As shown in FIG. 3, where the inclined angle of the rack gear tooth 14a formed as a helical gear is θ degree, a relationship between the component force Na in the axial direction and the component force Nv in the vertical direction of the force N acting on the rack 14 is expressed by the following equation.

$$Na = N \cdot \cos\theta \quad (7)$$

Further, in a plane shown in FIG. 3, where an angle of the pinion shaft 2 with respect to a direction perpendicular to the axial direction of the rack shaft 10 is θp degree, because N'=N according to the relationship between action and reaction, a relationship between the force N acting on the rack 14 and the component force Pa is expressed by the following equation.

$$N = Pa/\sin(\theta + \theta p) \quad (8)$$

By substituting Equations (7) and (8) into Equation (6), the following equation is obtained.

$$T = S \cdot Pa \cdot \cos\theta/(2\pi \cdot \sin(\theta + \theta p)) \quad (9)$$

As described above, the torque T applied to the pinion shaft 2 can be calculated by detecting the component force Pa in the axial direction of reaction force N' acting on the pinion 21, and applying the detected component force Pa to Equation (9). Here, in this embodiment, the component force Na in the axial direction of the force N acting on the rack 14 is positive to the right and negative to the left negative, and the component force Pa in the axial direction of the reaction force N' acting on the pinion 21 is positive to upward and negative to downward.

When the force detected by the load cell 6a provided below the pinion 21 is Sa, the component force Pa in the axial direction of the reaction force N' acting on the pinion 21 is expressed by the following equations.

$$Pa = 2(Sc - Sa) \qquad (10)$$

Here, Sc is a value detected by the load cell 6a when the steering torque applied to the steering wheel 30 is zero, and a preload appropriately adjusted by the change in the fitting depth of the lower lid 24 as described above. In the steering apparatus configured as above, when the steering wheel 30 is rotated to the left or to the right, because a downward or upward force acts on the pinion 21, the force Sa detected by the load cell 6a increases and decreases, and the value of the component force Pa becomes as negative or positive, respectively.

The detection result by the load cell 6a is transmitted to the assist control module 9a, as shown in FIG. 4. The assist control module 9a calculates the component force Pa in the axial direction of the reaction force N' acting on the pinion 21 by applying the force Sa detected by the load cell 6a to Equation (10), and calculates the torque T applied to the pinion shaft 2 by applying the calculated component force Pa to Equation (9). The calculated torque T which assumed to be applied to the pinion shaft 2 equals to the steering torque Th applied to the steering wheel 30.

The assist control module 9a transmits a control instruction to the steering assist motor 5 based on the steering torque Th calculated as described above, and performs an assist control operation to increase and decrease a drive current of the motor 5. Further, a detection result by the motor current sensor 50 for detecting the current of the steering assist motor 5 is also transmitted to the assist control module 9a. The current detected by the motor current sensor 50 is used as a feedback signal to control the steering assist motor 5.

The steering apparatus according to this embodiment configured as above calculates the force Pa acting on the pinion 21 in the axial direction by applying the force Sa detected by the load cell 6a to Equation (10). The steering apparatus then calculates the torque T applied to the pinion shaft 2, that is, the steering torque Th applied to the steering wheel 30 using Equation (9) based on the calculated Pa, as well as its direction. Therefore, it is not necessity to provide a torsion bar of low rigidity for the conventional torque sensor. Further, a steering feel can be improved by constituting the steering column 3 with a hollow or solid member of high rigidity. Further, because the load cell 6a is disposed inside the pinion housing 20 for supporting the pinion 21, it will not be exposed to outside environment. Further, it is possible to prevent problems such as a reduction in detection accuracy and a failure under the influence of foreign substances such as water, mud, dust, etc.

Further, the predetermined preload Sc is applied to the load cell 6a contacting the pinion 21 from one side in the axial direction, and the preload Sc is set larger than the assumed maximum force acting on the pinion 21 in the axial direction during steering. Therefore, the steering apparatus calculates the difference between the force Sa detected by the load cell 6a and the preload Sc, and can calculates the steering torque applied to the steering wheel 30 based on the calculated difference, as well as its direction.

Embodiment 4

Figure 6:
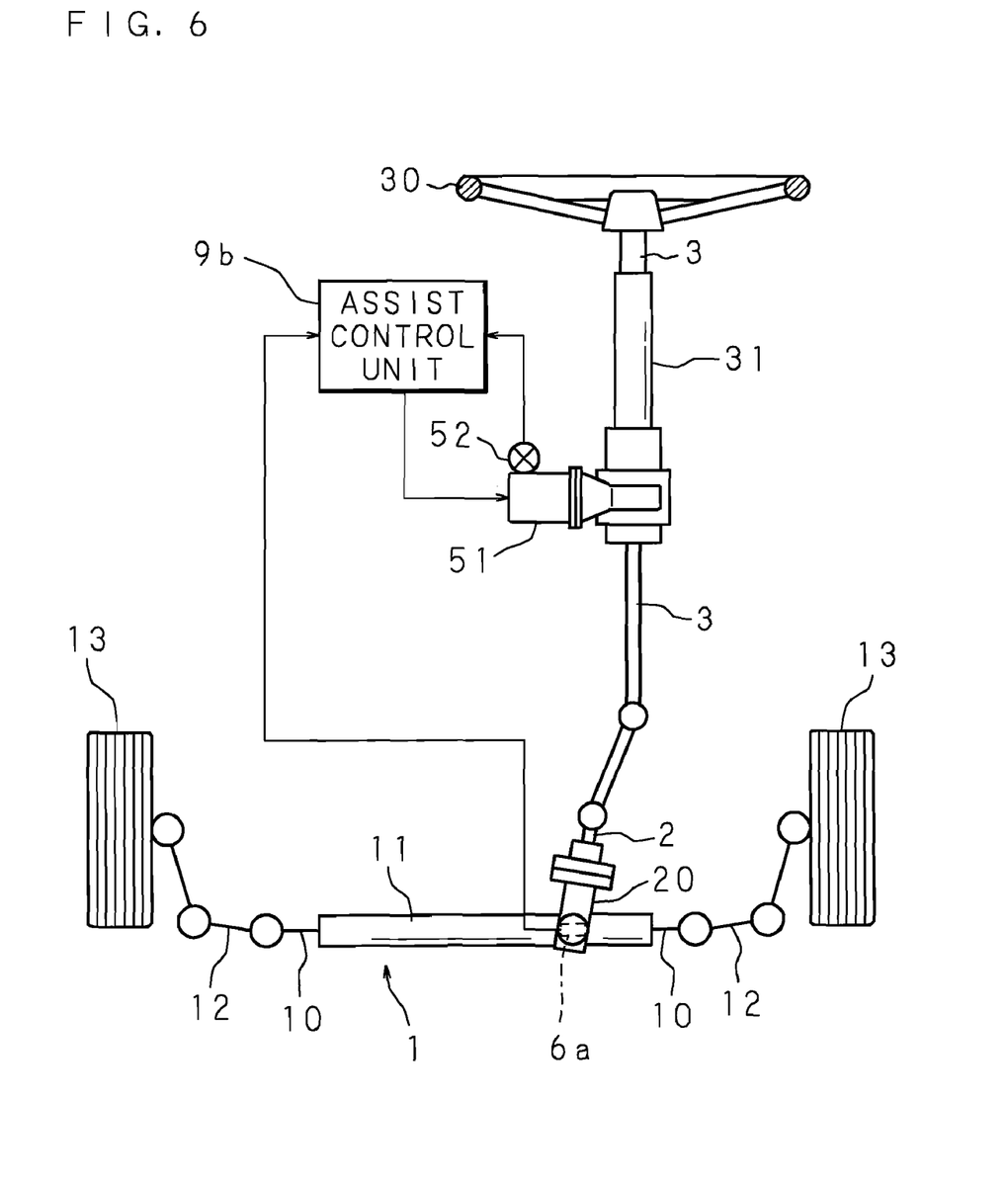
FIG. 6 is a schematic view showing a configuration of the steering apparatus according to one embodiment.

FIG. 6 is a schematic view showing a configuration of the steering apparatus according to another embodiment. The steering apparatus shown in FIG. 6 is configured as a column-assist-type electric power steering apparatus in which a steering assist motor 51 is attached to an intermediate position of the column housing 31 for supporting the steering column 3.

The steering assist motor 51 is attached to an outer peripheral surface of the column housing 31 so as to be approximately perpendicular to the axial center of the column housing 31. A worm fixed to an output end extending inside the column housing 31 meshes with a worm wheel outerly fitted onto the steering column 3. The rotation of the motor 51 is reduced in speed by the worm and the worm wheel, and is transmitted to the steering column 3 to assist the steering as described above. Because the other configuration is similar to that of the embodiment shown in FIG. 4, a similar reference numeral to that of FIG. 4 is assigned to a corresponding component to omit a detailed explanation of the configuration and operation. Here, because a procedure of calculating the torque applied to the pinion shaft 2 using the configuration of the load cell 6a, the load receiving seat 25, and the ball 26, and the force detected by the load cell 6a is similar to that of Embodiment 3 described above, its explanation will be omitted.

In the column-assist-type electric power steering apparatus, because the torque T applied to the pinion shaft 2 includes the assisting torque by the steering assist motor 51, in order to calculate the steering torque Th applied to the steering wheel 30, it is necessary to subtract the assisting torque from the torque T applied to the pinion shaft 2. Therefore, the steering torque Th acting on the steering wheel 30 can be expressed by the following equation using the torque T applied to the pinion shaft 2 which can be calculated by Equation (9).

$$Th = T - Tm - \alpha \qquad (11)$$

Here, Tm is a motor torque, and is expressed by the product of the motor current Is and the torque constant Kt of the motor. α is a transmission ratio of the worm and the worm wheel for reducing the rotation of the output shaft of the steering assist motor, and transmitting the reduced rotation to the pinion shaft 2.

Figure 7:
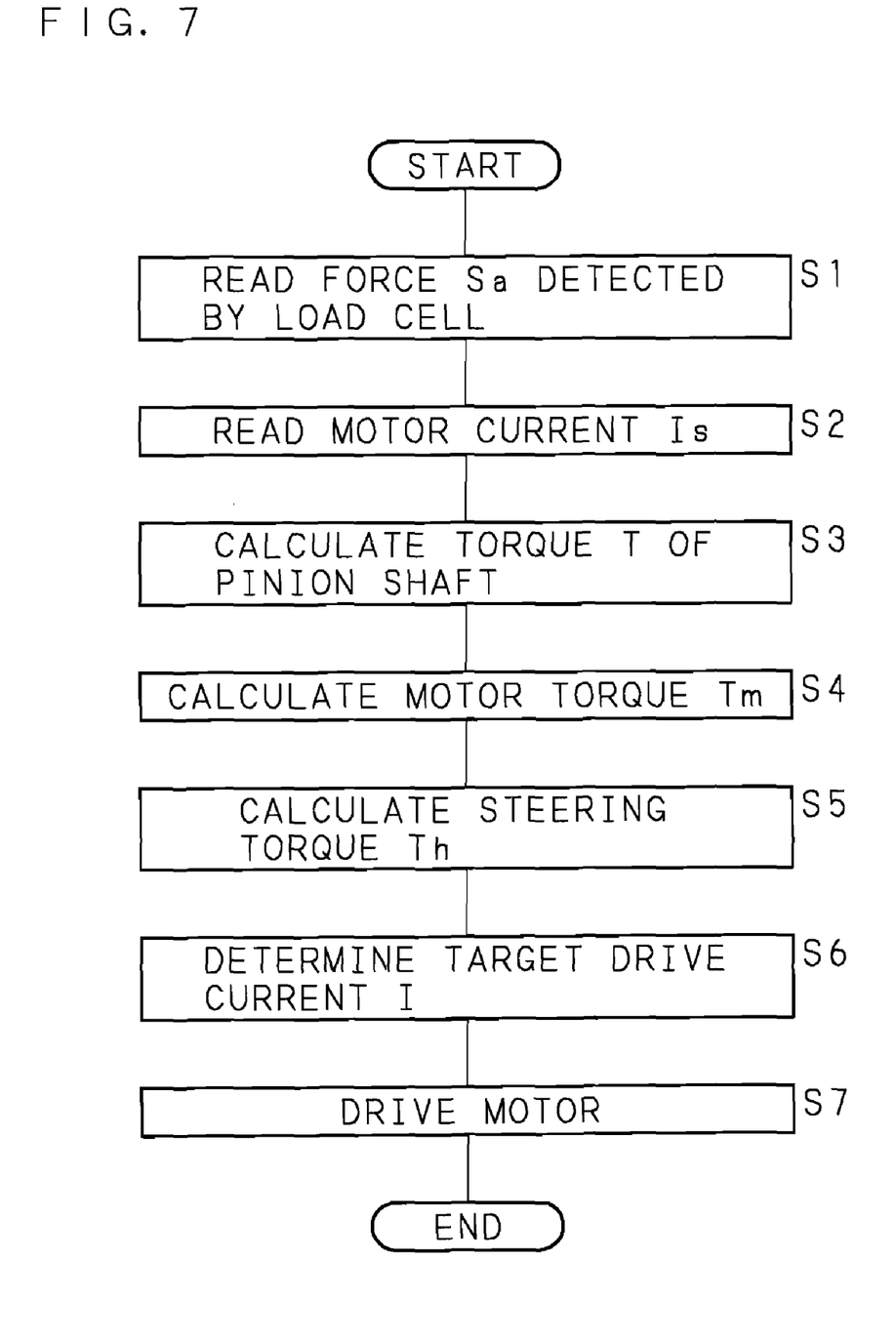
FIG. 7 is a flowchart showing a processing procedure of an assist control by an assist control module.

FIG. 7 is a flowchart showing a processing procedure of the assist control by the assist control module 9b. The assist control module 9b reads the force Sa detected by the load cell 6a and the motor current Is of the steering assist motor 51 detected by the motor current sensor 52, at a predetermined sampling period (Steps S1 and S2).

Next, the assist control module 9b calculates the component force Pa by applying the force Sa read in Step S1 to Equation (10), and calculates the torque T applied to the pinion shaft 2 by applying the calculated component force Pa to Equation (9) (Step S3).

On the other hand, the motor torque Tm is calculated using the motor current Is read in Step S2 (Step S4). As described above, the motor torque Tm can be calculated as a product of the motor current Is and the torque constant Kt of the motor.

The assist control module 9b calculates the steering torque Th by applying the torque T applied to the pinion shaft 2 which is calculated in Step S3 and the motor torque Tm calculated in Step S4 to Equation (11) (Step S5).

Next, the assist control module 9b determines a target drive current I to be supplied to the steering assist motor 51 to generate a target steering assist force using the steering torque Th (Step S6). In Step S6, the target drive current I may be determined by applying the calculated value of the steering torque Th which is calculated in Step S5 to the control map stored in the assist control module 9b, for example.

Then, the assist control module 9b calculates a deviation between the target drive current I obtained in Step 6 and the motor current Is flowing in the steering assist motor 51 read in Step S2. The assist control module 9b then calculates a motor voltage by performing a PID calculation to the deviation. The assist control module 9b then transmits a PWM signal based on the calculated result to a motor drive circuit (not illustrated) so that it drives the motor 51 (Step S7).

As described above, the steering apparatus is configured as a column-assist-type electric power steering apparatus in which the steering assist motor 51 is attached to the outer peripheral surface of the column housing 31, and transmits a power to the steering column 3. In the steering apparatus, the steering torque Th applied to the steering wheel 30 can also be calculated by subtracting the assisting torque by the steering assist motor 51 from the torque T applied to the pinion shaft 2. Therefore, it is not necessary to provide a torsion bar of low rigidity for the conventional torque sensor, and a steering feel can be improved by constituting the steering column 3 with a hollow or solid member of high rigidity.

In Embodiments 3 and 4, although it has been explained that the load cell 6a is provided below the pinion 21, modifications are not limited to this configuration, and the load cell may be provided above the pinion 21.

Embodiment 5

Figure 8:
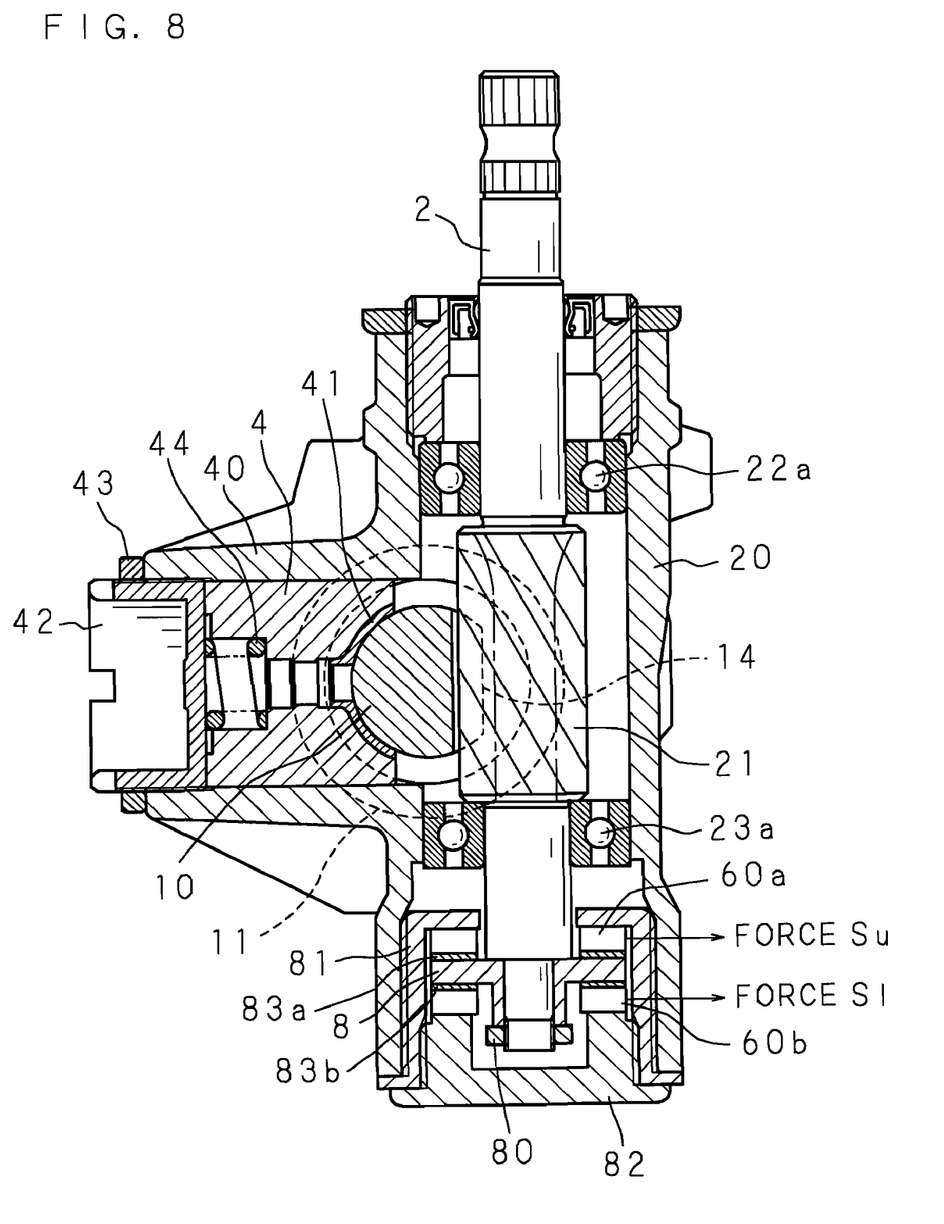
FIG. 8 is a longitudinal cross-sectional view schematically showing a configuration of a main portion of the steering apparatus according to one embodiment.

FIG. 8 is a longitudinal cross-sectional view schematically showing a configuration of a main portion of the steering apparatus according to another embodiment, and shows a portion in proximity to the intersecting portion of the pinion housing 20 and the rack housing 11, similar to FIG. 5. As illustrated, the bearings 22a and 23a provided both above and below the pinion 21 are deep groove ball bearings to movably support the pinion shaft 2 in the axial direction. The pinion shaft 2 extends downward from a supporting portion by the bearing 23a. A circular support plate 8 for supporting a thrust load is provided to an extended end of the pinion shaft 2. The support plate 8 is fixed to the pinion shaft 2 with a lock nut 80, and integrally rotates with the pinion shaft 2.

On the other hand, in an opening formed at a lower end of the pinion housing 20, a cylindrical holder 81 is tightly fitted. At the extended end into the pinion housing 20, the holder 81 includes a top plate opposing the support plate 8 from above. An annular load cell 60a is sandwiched between the opposing surfaces of the top plate and the support plate 8. The load cell 60a is fixed on one side thereof to the top plate of the holder 81, and the other side contacts the support plate 8 through a slide bearing 83a. The slide bearing 83a allows a relative rotation between the support plate 8 which integrally rotates with the pinion shaft 2 and the load cells 60a fixed to the holder 81 so that it does not transmits any torsion which affects to a detected force which will be mentioned later. For example, the slide bearing 83a may be a metal plate of, for example, zinc bronze which is excellent in a wear resistance. Further, instead of the slide bearing 83a, a ball or roller bearing such as a thrust ball bearing, a thrust roller bearing may be used.

Further, a bottom opening of the holder 81 is sealed with a lower lid 82 tightly fitted in to this opening. An upper end face of the lower lid 82 opposes a lower surface of the support plate 8 from below, and an annular load cell 60b is sandwiched between these opposing surfaces. A load cell 60b is fixed to the lower lid 82 at one side, and the other side contacts the support plate 8 through a slide bearing 83b. Because the configuration and action of the slide bearing 83b are similar to that of the upper slide bearing 83a, the explanation will be omitted.

In the above configuration, when an upward force acts on the pinion shaft 2, the upper load cell 60a is pressed against the holder 81. Accordingly, the force Su detected by the load cell 60a increases, and the force Sl detected by the load cell 60b decreases. On the other hand, when a downward force acts on the pinion shaft 2, the lower load cell 60b is pressed against the lower lid 82. Accordingly, the force Sl detected by the load cell 60b increases, and the force Su detected by the load cell 60a decreases. Here, the slide bearings 83a and 83b described above function to transmit only a force in the axial direction to the load cells 60a and 60b, respectively, without transmitting a moment about the center axis generated in accordance with the rotation of the pinion 21. That is, the slide bearings 83a and 83b function to not affect the detection of the force applied to pinion 21 in the axial direction. Because the other configuration is similar to that of the embodiment shown in FIG. 5, a similar reference numeral to that of FIG. 5 is assigned to a corresponding component, and the detailed explanation for the configuration and of operation will be omitted.

In Embodiment 5, the forces Su and Sl applied to the pinion 21 to the respective directions are detected by the load cells 60a and 60b, respectively. Therefore, the steering apparatus calculates the difference (=Su−Sl) between the detected force Sl and the force Su detected by the load cell 60a with the force Sl detected by one of the load cell (60b) being a reference for the other. Then, the steering apparatus can calculate the torque T applied to the pinion shaft 2 as well as its direction by applying the calculated difference to Equation (24) as the force Pa acting on the pinion 21 in the axial direction.

When the steering torque Th is applied to the steering wheel 30, and a downward or upward force acts on the pinion 21 in the axial direction by the reaction of the applied force from the pinion 21 to the rack 14 generated according to the steering torque Th, Pa that is a difference between the forces detected by the load cells 60a and 60b increases or decreases. Therefore, similar to the embodiment described above, it is possible to calculate the steering torque Th applied to the steering wheel 30 as well as its direction. It is not necessity to provide a torsion bar of low rigidity for the conventional torque sensor, and a steering feel can be improved by constituting the steering column 3 with a hollow or solid member of high rigidity.

Embodiment 6

Figure 9:
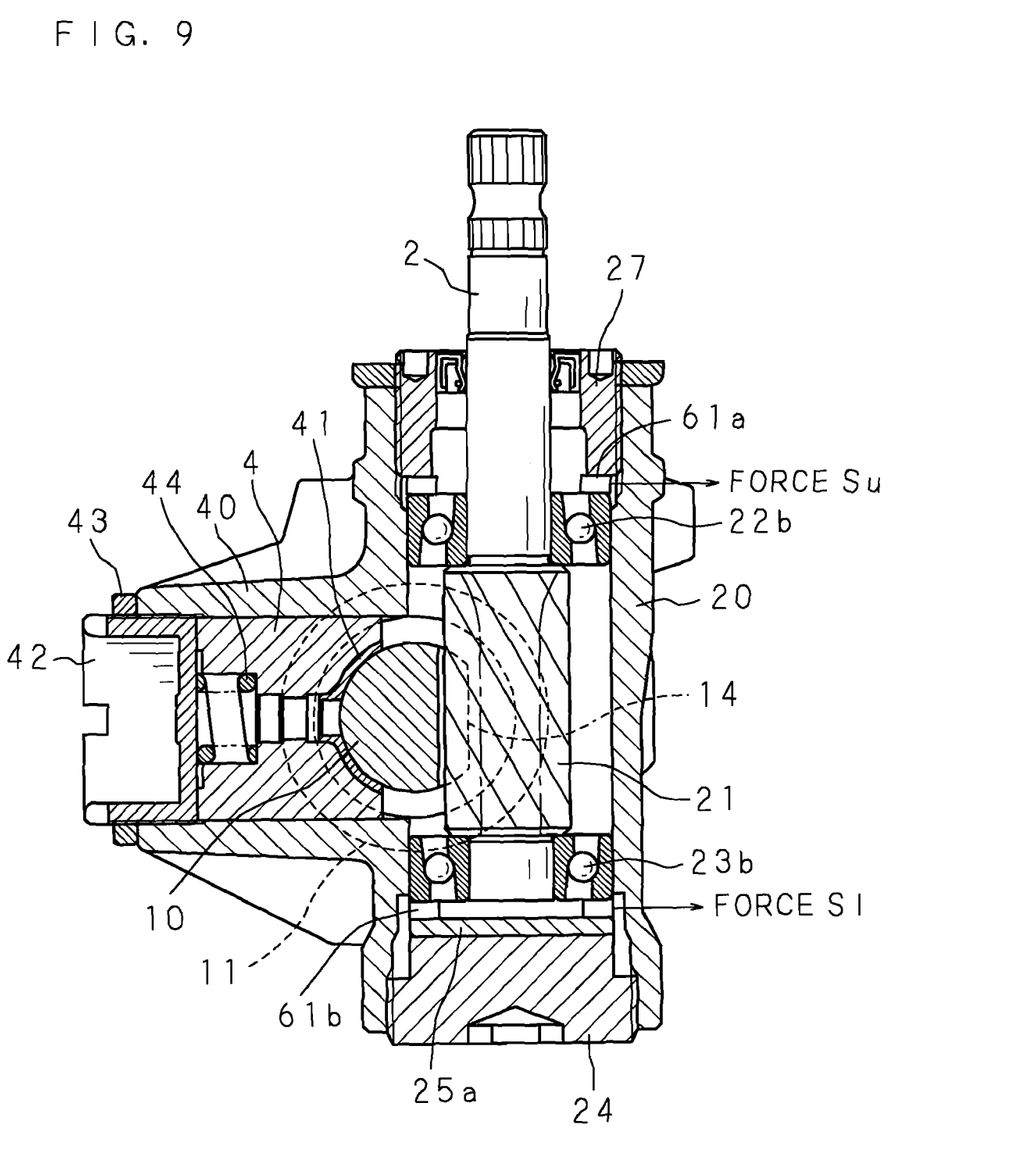
FIG. 9 is a longitudinal cross-sectional view schematically showing a configuration of a main portion of the steering apparatus according to one embodiment.

FIG. 9 is a longitudinal cross-sectional view schematically showing a configuration of a main portion of the steering apparatus according to another embodiment, and shows a portion in proximity to the intersecting portion of the pinion housing 20 and the rack housing 11, similar to FIG. 5. In this embodiment, the pinion shaft 2 is supported by angular contact ball bearings 22b and 23b which contact both upper and lower end faces of the pinion 21, respectively.

A lower surface of the angular contact ball bearing 23b opposes the upper end face of the lower lid 24 tightly fitted in the lower end opening of the pinion housing 20, as described above. An annular load cell 61b is supported by the upper end face through the load receiving seat 25a. The load cell 61b contacts the lower end face of the pinion 21 through the angular contact ball bearing 23b.

On the other hand, an opening portion from which the pinion shaft 2 projects is provided in the upper end of the pinion housing 20. An upper lid 27 which serves as a holder for an oil seal for sealing the outer peripheral surface of the pinion shaft 2 is tightly fitted in the opening. A lower portion of the upper lid 27 extends inside the pinion housing 20, and the extended end opposes the upper surface of the upper angular contact ball bearing 22b. An annular load cell 61a is sandwiched between the opposing surfaces. The load cell 61a contacts an upper end face of the pinion 21 through the angular contact ball bearing 22b.

With the above configuration, when a downward force acts on the pinion shaft 2, the lower load cell 61b pressed against the lower lid 24. Accordingly, the force Sl detected by the load cell 61b increases, and the force Su detected by the load cell 61a decreases. Here, the load receiving seat 25a is provided to stably act the force in the axial direction on the load cell 61b.

On the other hand, when an upward force acts on the pinion shaft 2, the upper load cell 61a is pressed against the upper lid 27. Accordingly, the force Su detected by the load cell 61a increases, and the force Sl detected by the load cell 61b decreases. Because the other configuration is similar to that of the embodiment shown in FIG. 5, a similar reference numeral as that of FIG. 5 is assigned to a corresponding component and, thus, the detailed explanation for the configuration and operation will be omitted.

In this embodiment, the forces Su and Sl applied to the pinion 21 to the respective directions are detected by the load cells 61a and 61b, respectively. The steering apparatus calculates the difference (=Su−Sl) between the force Sl detected by one load cell 61b and the force Su detected by the other load cell 61a, with the force Sl being a reference to the other. Therefore, the steering apparatus can calculate the torque T applied to the pinion shaft 2 as well as its direction by applying the calculated difference to Equation (9) as the force Pa acting on the pinion 21 in the axial direction.

When the steering torque Th is applied to the steering wheel 30, and a force acts on the pinion 21 downwardly or upwardly in the axial direction by the reaction of the applied force from the pinion 21 to the rack 14 generated according to the steering torque Th, Pa which is a difference between the forces detected by the load cells 61a and 61b increases or decreases. Therefore, similar to the embodiment described above, the steering apparatus can calculate the steering torque Th applied to the steering wheel 30 as well as its direction. It is not necessary to provide the torsion bar of low rigidity for the conventional torque sensor, and a steering feel can be improved by constituting the steering column 3 with a hollow or solid member of high rigidity.

Moreover, if elastic coefficients of the supporting portions for supporting the pinion 21 from both side, or more specifically, elastic coefficients determined by a structure of the angular contact ball bearings 22b and 23b and the housing for supporting the angular contact ball bearings 22b and 23b, and the like are approximately equal, the steering apparatus may be able to calculate the steering torque with more accuracy.

In the above Embodiments 3 to 6, it has been explained that the load cell is used as the detection means for detecting the force Pa acting on the pinion 21 in the axial direction. However, modifications are not limited to this configuration, and the detection means may be any means capable of detecting the force Pa acting the pinion 21 in the axial direction.

According to the disclosure, it is not necessary to provide the torsion bar of low rigidity for the conventional torque sensor, and a steering feel can be improved by constituting the steering column with a hollow or solid member of high rigidity. Further, the detection means is provided so as not to be exposed to outside environment. For example, the detection means may be provided inside the yoke housing for supporting the support yoke. Therefore, it is possible to prevent problems such as a reduction in detection accuracy and a failure caused by foreign substances such as water, mud, dust, etc.

According to the disclosure, the detection means is constituted by two force sensors disposed at symmetrical positions with respect to a plane defined by the support yoke and the rack shaft, for example, a plane including axial centers of the support yoke and the rack shaft. The calculation means calculates a difference between the forces detected by these two force sensors, and calculates a steering torque applied to the steering member based on the calculated difference. Therefore, it is possible to calculate the steering torque applied to the steering member, as well as a direction of the steering torque based on the sign (positive/negative) of the calculated difference by calculating the difference between the forces by both the force sensors, or the difference of one force by one of the force sensors with respect to the other force by the other force sensor.

According to the disclosure, the detection means detects a force applied to the pinion in the axial direction by a reaction of the force acting on the meshed portion of the pinion and the rack in accordance with an operation of the steering member. Based on the detection, a torque applied to the pinion shaft is then calculated, for example, using a relational equation of the action and the reaction of the force acting between the rack and the pinion, and a relational equation of the torque and the rack shaft force applied to the pinion shaft. The steering torque is then calculated based on the calculated torque. Therefore, it is not necessary to provide a torsion bar of low rigidity for the conventional torque sensor, and the steering feel can be improved by constituting the steering column with a hollow or solid member of high rigidity. Further, the detection means may be provided inside the pinion housing for supporting the pinion shaft so as not to be exposed to outside environment. Therefore, it is possible to prevent problems such as a reduction in detection accuracy and a failure under the influence of foreign substances such as water, mud, dust, etc.

According to the disclosure, a predetermined preload, specifically, that is larger than the assumed maximum force acting on the pinion in the axial direction during steering, is applied to the force sensor contacting the pinion from one side in the axial direction. Therefore, it is possible to calculate the difference between the detection value by the force sensor and the preload value and, thereby calculating the steering torque applied to the steering member based on the calculated difference, as well as its direction.

According to the disclosure, by two force sensors contacting the support plate disposed at one side of the pinion, from both sides in the axial direction, respectively, forces applied to the pinion in the respective directions are detected. Then, a difference between the detection value by one of the force sensors and the detection value by the other force sensor, that is, a difference of the detection value by one of the force sensors with respect to the detection value by the other force sensor is calculated. Therefore, it is possible to calculate the steering torque applied to the steering member based on the calculated difference, as well as its direction.

According to the disclosure, by the force sensors contacting the pinion from both sides in the axial direction, respectively, forces applied to the pinion in the respective directions are detected. Then, a difference between the detection value by one of the force sensor and the detection value by the other force sensor, that is, a difference of the detection value by one of the force sensors with respect to the detection value by the other force sensor is calculated. Therefore, it is possible to calculate the steering torque applied to the steering member based on the calculated difference, as well as its direction.

As this description may be embodied in several forms without departing from the spirit of essential characteristics thereof, the present embodiments are therefore illustrative and not restrictive, since the scope of the description is defined by the appended claims rather than by the description preceding them, and all changes that fall within metes and bounds of the claims, or equivalence of such metes and bounds thereof are therefore intended to be embraced by the claims.

What is claimed is:

1. A steering apparatus including a pinion that rotates in accordance with an operation of a steering member, a rack shaft having a rack meshed with the pinion, and a support yoke resiliently coming into contact with the rack shaft from an opposite side of a meshed portion of the rack and the pinion so as to be provided with the rack shaft between the opposite side and the meshed portion, and being configured to convert rotation of the pinion into movement of the rack shaft in an axial direction, the steering apparatus comprising:
   a detection unit for detecting a force applied to the support yoke to which a force acting on the meshed portion is transmitted from the rack shaft; and
   a calculation unit for calculating a steering torque applied to the steering member based on the force detected by the detection unit,
   wherein the pinion and the rack are formed in helical gears, and
   the detection unit includes a plurality of force sensors disposed between the rack shaft and the support yoke.

2. The steering apparatus according to claim 1, wherein the acting force on the meshed portion includes a component force of a force acting from the pinion on the rack in the meshed portion in a direction perpendicular to a plane defined by the support yoke and the rack shaft.

3. The steering apparatus according to claim 1, wherein the plurality of force sensors is two force sensors disposed at symmetrical positions with respect to a plane defined by the support yoke and the rack shaft, and wherein the calculation unit calculates a difference between the forces detected by the force sensors and calculates the steering torque based on the calculated difference.

4. The steering apparatus according to claim 1, wherein the plurality of force sensors is two force sensors disposed at symmetrical positions with respect to a plane defined by a central axis perpendicular to a circular cross section of the support yoke and an axis of the rack shaft.

5. The steering apparatus according to claim 3, wherein the calculation unit calculates a difference between component forces of forces detected by the respective forces sensors in a direction perpendicular to the plane and calculates the steering torque based on the calculated difference.

6. The steering apparatus according to claim 3, wherein a direction of the force detected by each of the force sensors is approximately perpendicular to the plane.

7. The steering apparatus according to claim 1, wherein two force sensors of the plurality of force sensors are disposed at symmetrical positions with respect to a plane defined by the support yoke and the rack shaft, and wherein the calculation unit calculates a difference between the forces detected by the force sensors and calculates the steering torque based on the calculated difference.

8. The steering apparatus according to claim 1, wherein two force sensors of the plurality of force sensors are disposed at symmetrical positions with respect to a plane defined by a central axis perpendicular to a circular cross section of the support yoke and an axis of the rack shaft.

9. The steering apparatus according to claim 7, wherein the calculation unit calculates a difference between component forces of forces detected by the respective forces sensors in a direction perpendicular to the plane and calculates the steering torque based on the calculated difference.

10. The steering apparatus according to claim 7, wherein a direction of the force detected by each of the force sensors is approximately perpendicular to the plane.

* * * * *